April 9, 1935.     C. M. ESCARÉ     1,997,513
PLUG FOR WALLS OR THE LIKE
Filed June 1, 1934

C. M. Escaré
INVENTOR

By: Marks & Clerk
Attys.

Patented Apr. 9, 1935

1,997,513

UNITED STATES PATENT OFFICE 1,997,513

PLUG FOR WALLS OR THE LIKE

Charles Maurice Escaré, Holloway, London, England

Application June 1, 1934, Serial No. 728,606
In Great Britain June 1, 1933

6 Claims. (Cl. 85—2.4)

This invention relates to plugs for attaching articles to walls and the like.

Wall plugs or sockets are known which consist in a soft metal sleeve that is expanded when inserting a holding screw, the outer surface of the sleeve having circular ribs, or having a polygonal or other non-circular section.

It has also been proposed in an expansible metal wall plug provided with internal and external longitudinal ribs, to have the outer surface roughened or formed with projections.

The main object of the invention is to provide a wall plug that ensures a firm adherence to the walls of a prepared hole and which is cheap to manufacture.

The invention consists in a wall plug comprising a soft metal tube of circular section in which a screw or bolt is adapted to be screwed therein to expand the plug to grip the walls of a prepared hole characterized in that the outside of the sleeve is covered with an abrasive material.

The invention also consists in the further features as claimed and described hereinafter.

According to the present invention the plug is formed of a tube of metal, preferably lead or an alloy of lead $a$ as shown in the accompanying drawing, the outer diameter of which when prepared and in condition for inserting in a hole that has previously been made in the wall or the like, can be easily driven therein.

The walls of the plug or tube are of a thickness which is slightly in excess of the depth of the thread of the screw which is to be inserted into the tube so that when the screw is screwed into the tube the screw thread will cut its way into the material of the tube there being a little thickness allowed beyond the outer diameter of the screw thread which will be expanded into the walls of the hole into which the tube is inserted.

Figure 1:
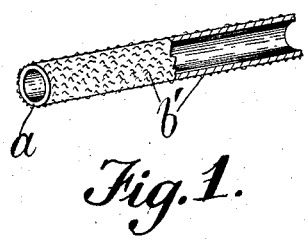
Fig. 1 is a perspective view, partly in section, of one embodiment of the invention.
Figure 2:
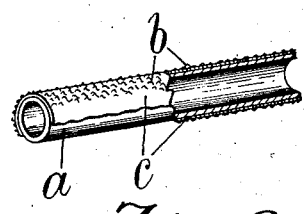
Fig. 2 is a perspective view, partly in section, of a second embodiment of the invention.

In order to ensure a firm adherence of the tube $a$ to the wall of the prepared hole, the outside surface of the tube in the embodiment illustrated in Fig. 2 is coated with an adhesive $c$ such as glue, paste, resin, rubber or cellulose solution or the like. An abrasive material $b$, for example, carborundum, emery, powdered glass, sand or the like is then applied to the tube and allowed to dry. When dry and hard, the outer surface of the tube is rough and gritty thus forming a strong key between the metal and the wall of the hole into which the plug is to be inserted, thereby preventing any tendency to rotate during the screwing into the tube of the screw that attaches an article to the wall. Alternatively the adhesive and the abrasive may be mixed before being applied to the tube as shown in Fig. 1. In this embodiment this mixture $b'$ effects a roughened outer surface on the tube $a$.

Before applying the adhesive or the mixture to the outer surface of the plug, the surface may be roughened, for example, by means of a file or passing the same between rollers having a suitably broken up surface or surfaces or the tube may be roughened by any other means with the desired result.

Having now described my invention what I claim as new and desire to secure by Letters Patent is:—

1. A wall plug for attaching articles to a wall or the like comprising a soft metal tube of circular cross section in which a screw or bolt is adapted to be screwed, the said tube having on its outer surface an abrasive thereby permitting the tube when expanded by the screw to grip the walls of the hole.

2. A wall plug as claimed in claim 1 in which the outer surface of the tube is roughened before the abrasive covering is applied.

3. A wall plug as claimed in claim 1 in which adhesive is applied to the outer surface of the tube and the abrasive applied as a covering on said adhesive.

4. A wall plug as claimed in claim 1 in which the outer surface of the tube is roughened, an adhesive applied to the roughened surface of the tube, said abrasive being applied as a covering on said adhesive.

5. A wall plug as claimed in claim 1 in which the abrasive is mixed with an adhesive and applied as a covering to said tube.

6. A wall plug as claimed in claim 1 in which the outer surface of said tube is roughened, and an adhesive mixed with said abrasive and applied as a covering to said roughened surface.

CHARLES MAURICE ESCARÉ.